Jan. 22, 1946.  A. W. METZNER  2,393,332
DUAL STRIP FEEDING APPARATUS
Filed Oct. 28, 1942  7 Sheets-Sheet 6
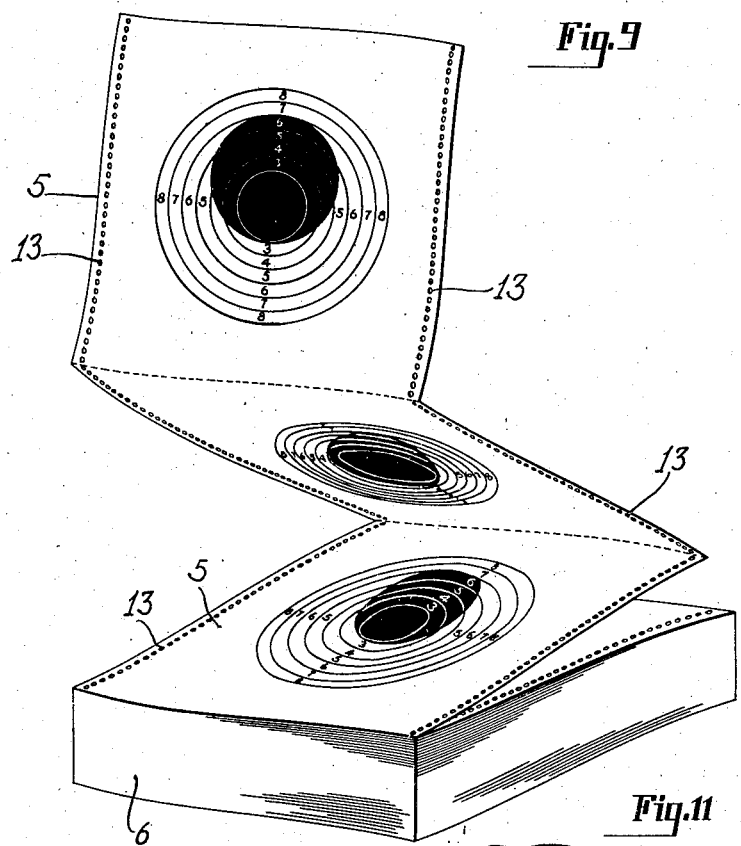
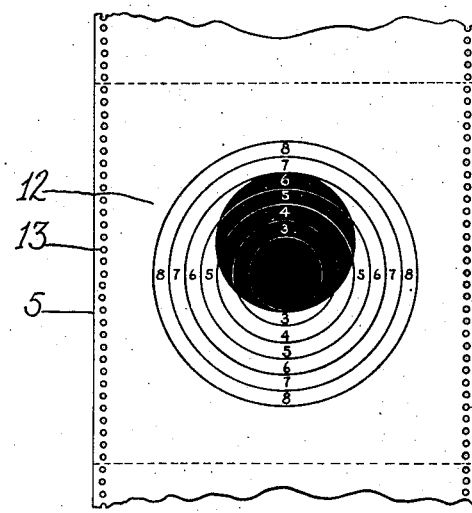
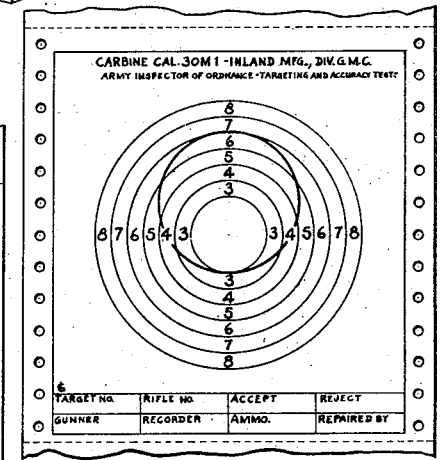
INVENTOR
ALBERT W. METZNER
BY
ATTORNEY Jan. 22, 1946.     A. W. METZNER     2,393,332
DUAL STRIP FEEDING APPARATUS
Filed Oct. 28, 1942     7 Sheets-Sheet 7
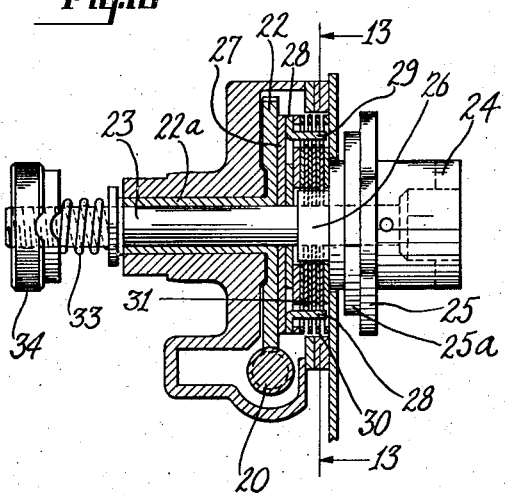
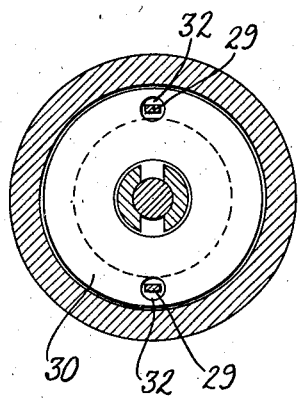
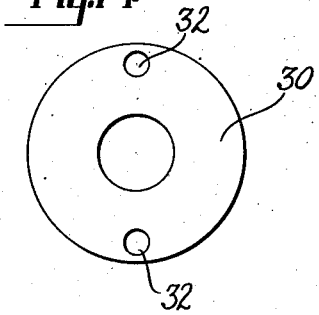
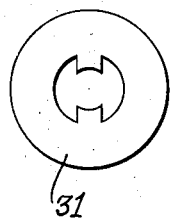
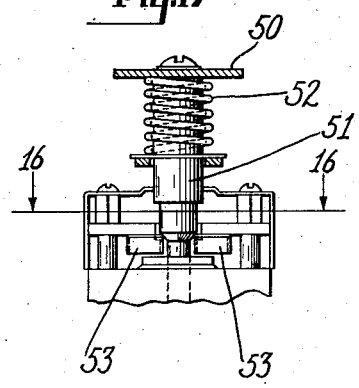
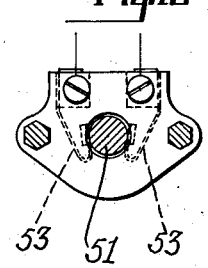
INVENTOR
ALBERT W. METZNER
ATTORNEY Patented Jan. 22, 1946

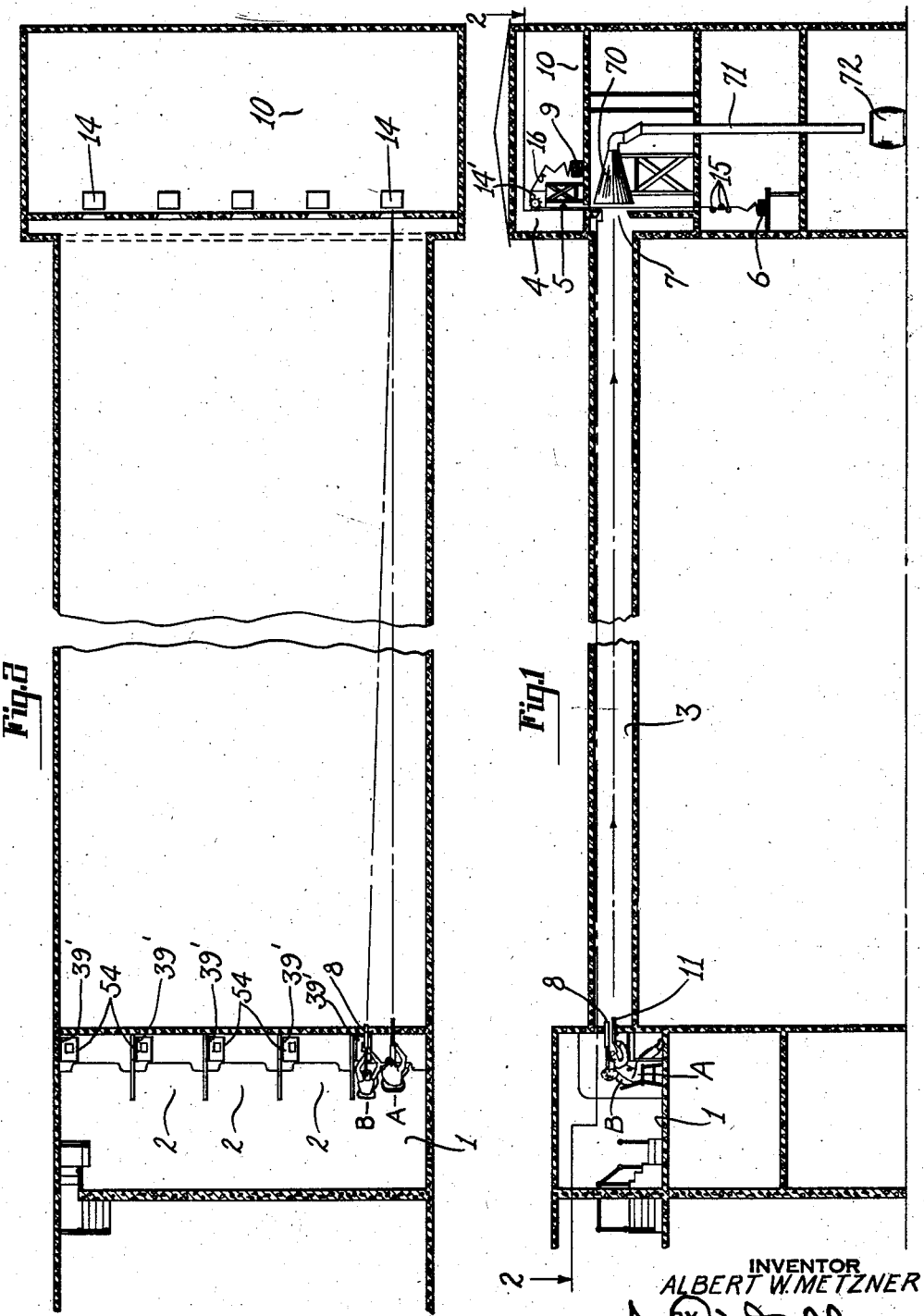

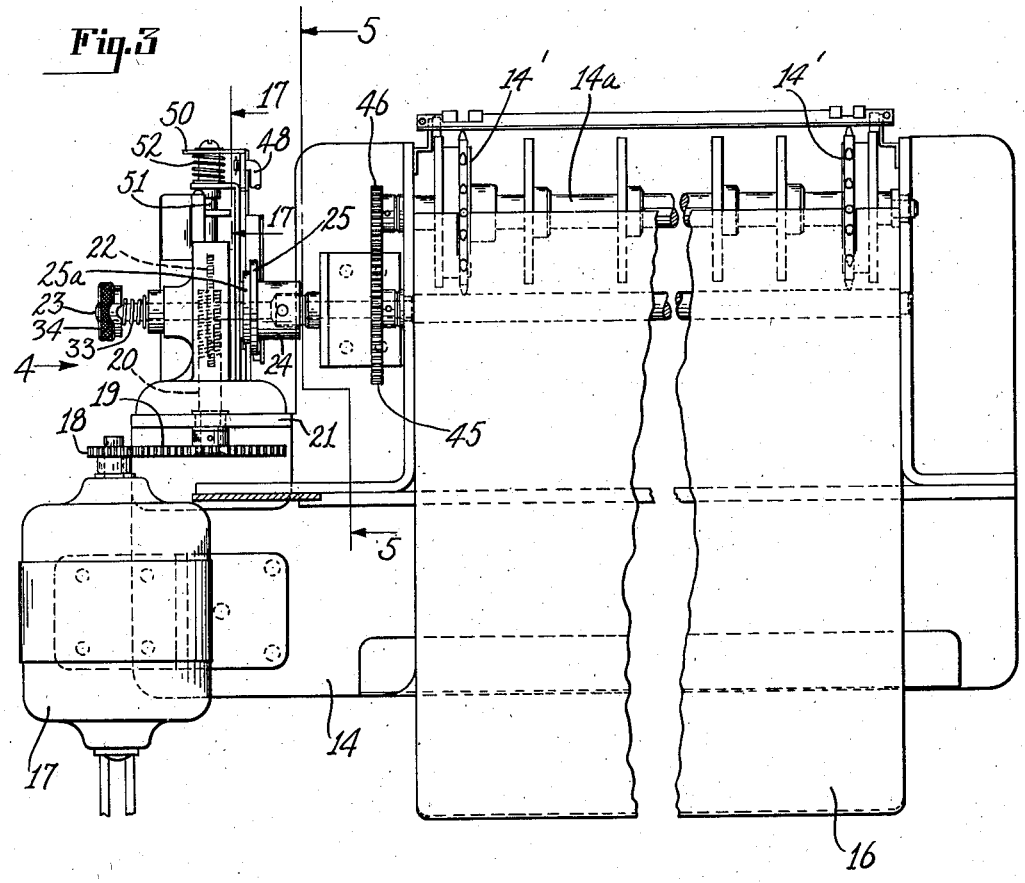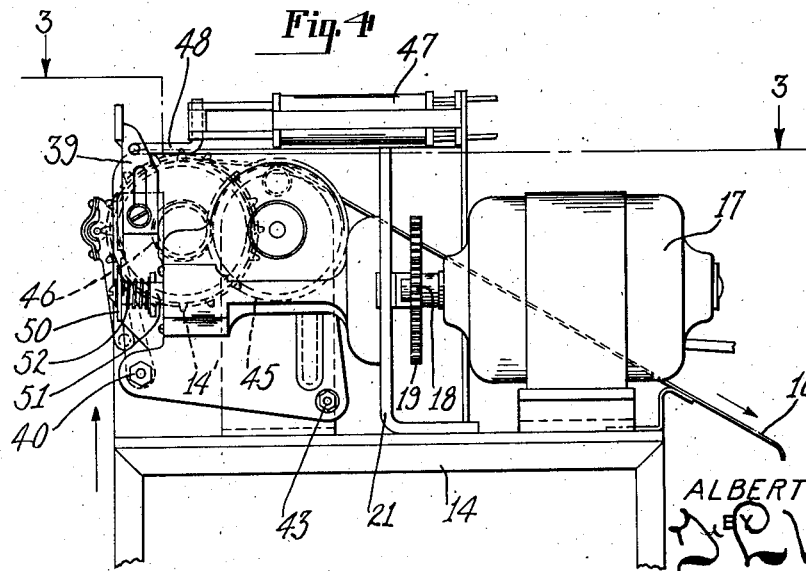

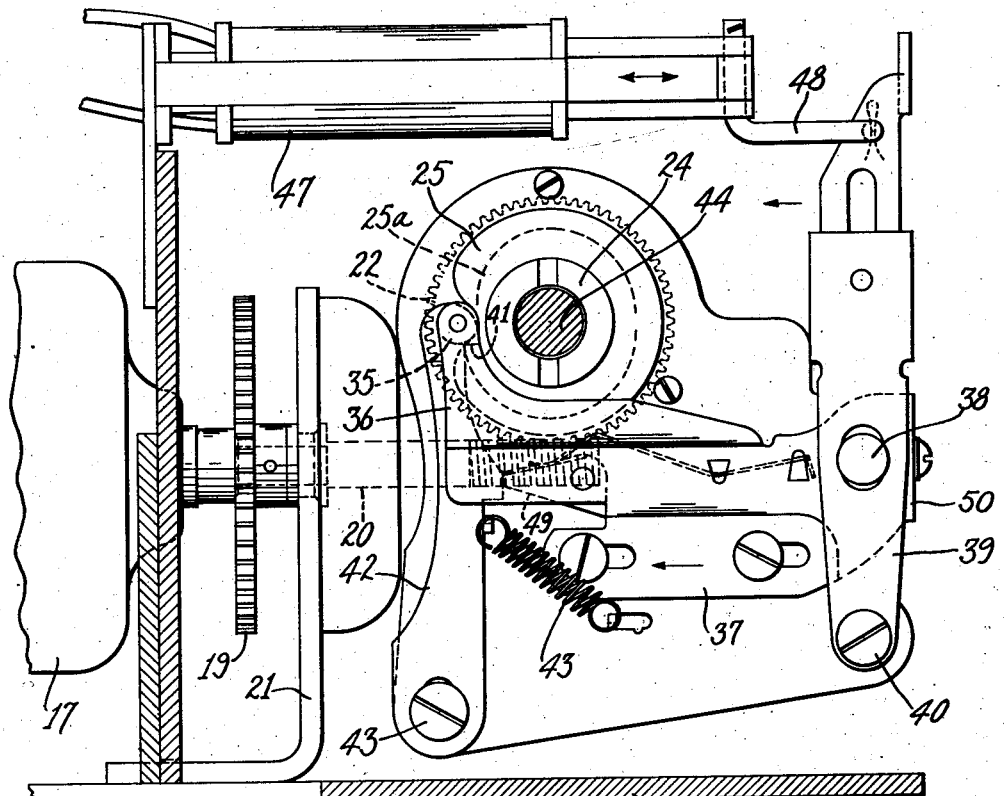

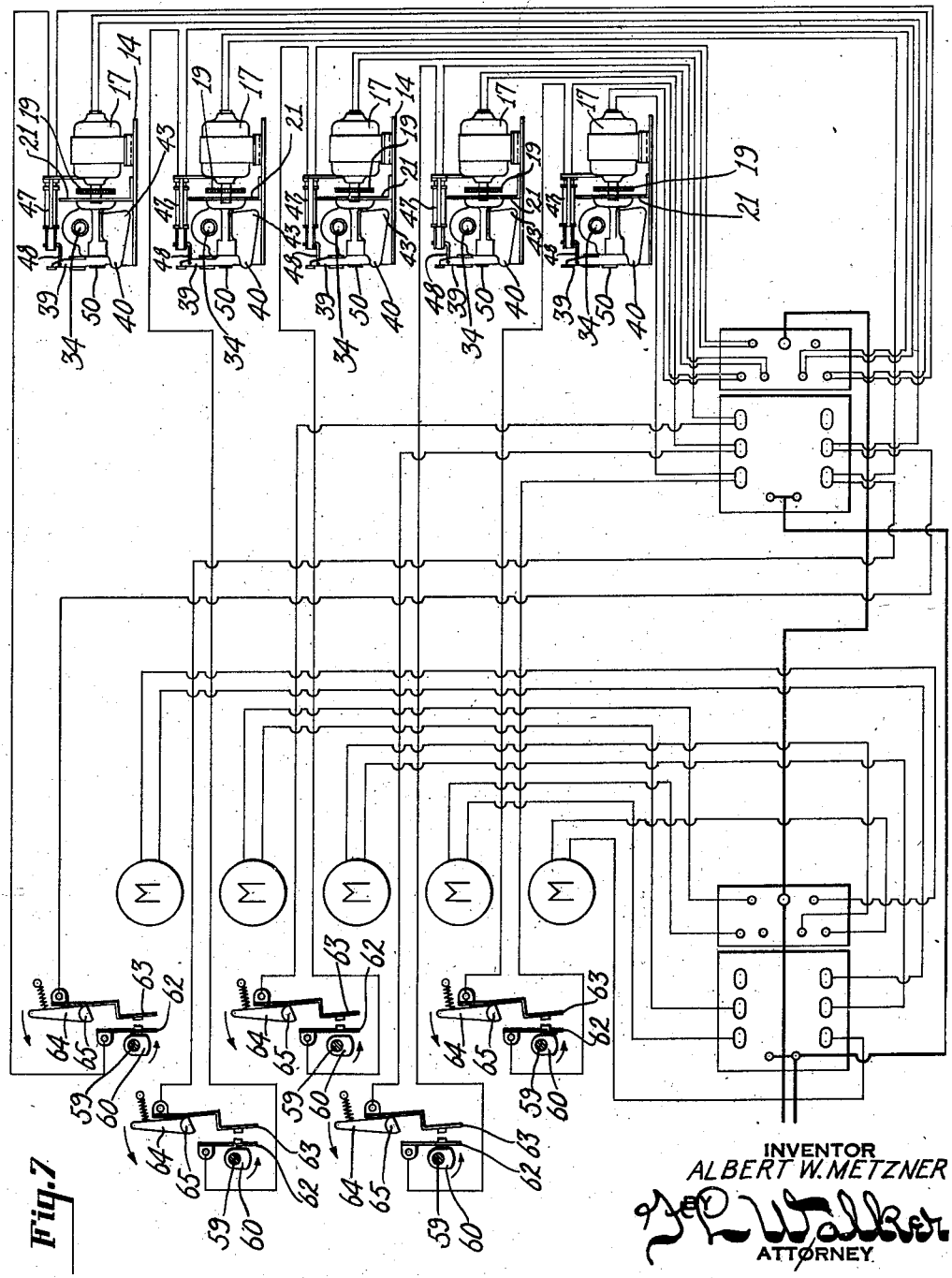

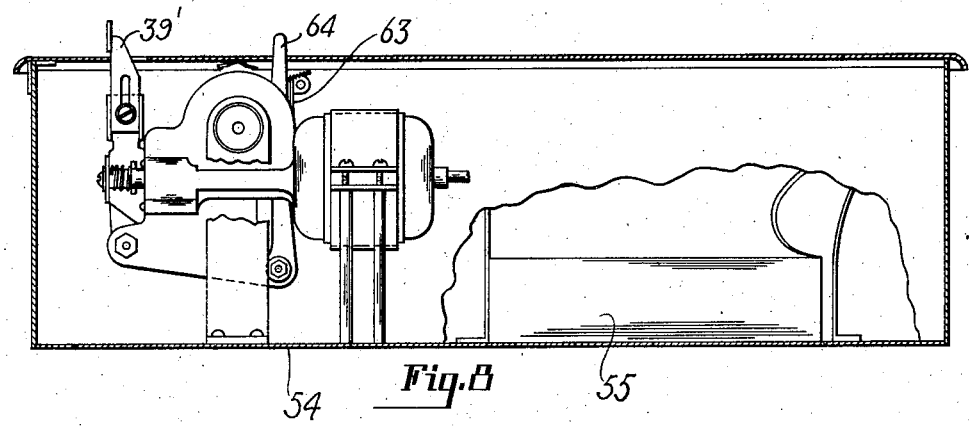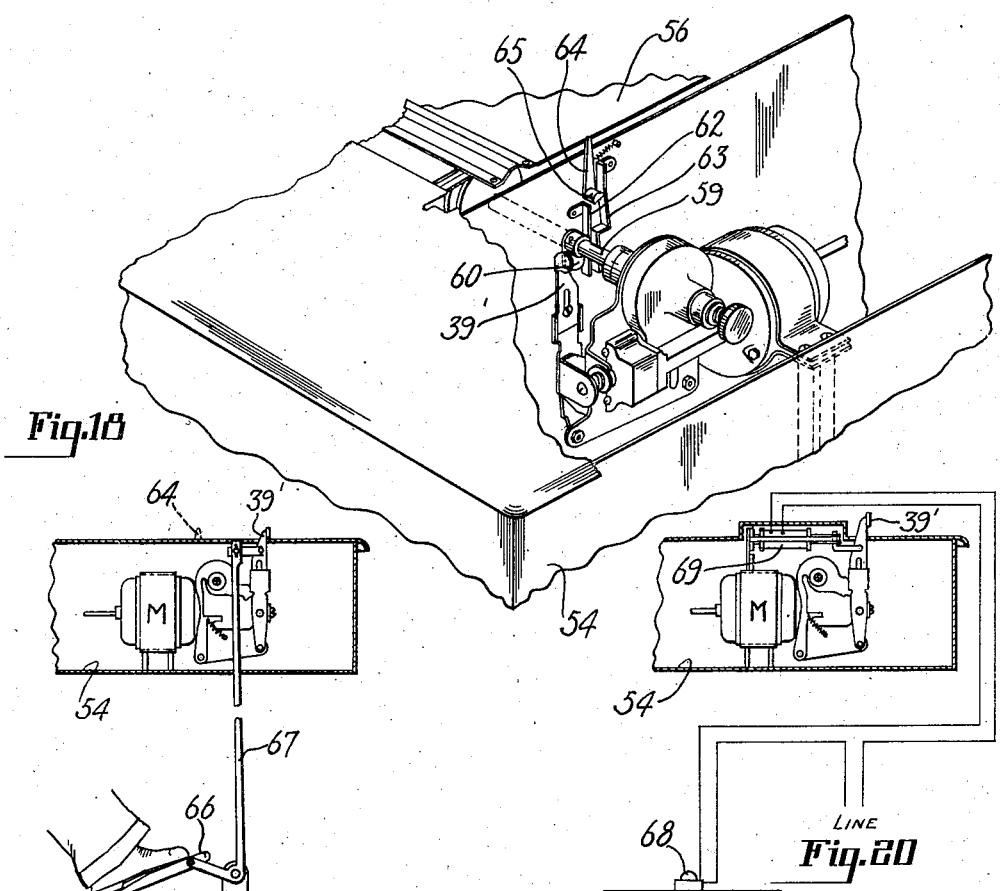

2,393,332

UNITED STATES PATENT OFFICE 2,393,332

DUAL STRIP FEEDING APPARATUS

Albert W. Metzner, Dayton, Ohio, assignor to The Standard Register Company, Dayton, Ohio, a corporation of Ohio Application October 28, 1942, Serial No. 463,607

18 Claims. (Cl. 273—102)

This invention pertains to a system of testing firearms and recording the results thereof, and more particularly to apparatus for interchanging targets and correlated score sheets upon which the hits upon the target may be recorded, and remote control synchronizing means for the target and score sheet changing mechanism and the mode of operation.

While the present apparatus is readily applicable to shooting galleries and practice ranges, it has been especially designed for testing newly manufactured firearms for war purposes and making individual records of the accuracy thereof, to accompany the tested guns. Quite naturally, there is a wide range of the shooting qualities of firearms as they are completed by the manufacturer, some of which are necessarily rejected, and it is desirable that the degree of accuracy of others be known. To test the arms, they are fired at individual targets, and the results are noted on a record slip or ticket to be attached to the gun.

To enable the used targets to be rapidly interchanged for fresh targets without exposure of an operator to danger, and simultaneously interchange record slips or tickets while maintaining the sequence of the targets and record slips in relation to each other and in relation to the order in which the firearms have been tested, is of primary importance.

In the present disclosure there has been provided remote control means by which a continuous strip of series connected targets is advanced one target length at a time and the targets successively presented in the field of vision of a shooter, and simultaneously a corresponding score sheet is advanced into recording position upon which an observer may record the result of the test as it appears on the distantly positioned target.

Primary purposes of the invention are to speed and improve the accuracy of proof-firing inspection, remove personal hazards at the target, relieve the gunner of tension and fatigue, and provide multiple accurate inspection tickets which are easily identified according to the result of the test.

The object of the invention is to improve the mode of operation of testing shooting skill and efficiency of firearms and recording the results thereof by providing correlated dual feeding mechanism for positioning a succession of targets and corresponding record or score sheets, which may not only be economically manufactured and operated, but will be efficient in use, automatic in action, uniform in operation, having relatively few operating parts, and be unlikely to get out of repair.

A further object of the invention is to provide target sheets in a continuous series connected strip assembly, and feeding means for advancing the strip to present successive targets in the field of vision.

A further object of the invention is to provide remote control means for successively presenting a plurality of targets in a distant field of operation and interchanging the targets one for another as used.

A further object of the invention is to provide interchangeable score or record sheets and interchange such record sheets in synchronism with interchange of distantly located targets.

A further object of the invention is to provide dual control and feeding apparatus for progressively advancing a succession of targets and a succession of corresponding record or score sheets in synchronism with each other.

A further object of the invention is to provide a remote control target interchange system and correlated score sheet interchange mechanism having the advantageous structural features and inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein the preferred but obviously not necessarily the only form of embodiment of the invention is shown, Fig. 1 is a vertical sectional view of a building structure housing a firearm testing range equipped with the system and target and score sheet feeding mechanism forming the subject matter hereof.

Fig. 2 is a top plan sectional view, of the shooting range illustrated in Fig. 1.

Fig. 3 is a top plan view of the remote control motor operated target strip feeding mechanism in the plane 3—3 of Fig. 4.

Fig. 4 is a side elevation thereof from the left of Fig. 3.

Fig. 5 is an enlarged side sectional elevation of the target strip feeding mechanism, in section on the plane 5—5 of Fig. 4, illustrating the side opposite that shown in Fig. 4.

Fig. 6 is a longitudinal sectional view of the score sheet or record slip recording apparatus.

Fig. 7 is a diagrammatic view of the electrical control circuit for remote control and synchronism of the distantly located strip feeding and target positioning mechanism and the correlated score sheet or record slip feeding apparatus.

Fig. 8 is a side elevation of the common control devices for the recording and score ticket issuing unit and the distantly located target positioning apparatus, by which the operation of the respective mechanisms is synchronized.

Fig. 9 is a perspective view of a packet of continuous series connected target sheets forming a part of the present firearm test system.

Fig. 10 is a face view of one of the remotely interchangeable targets.

Fig. 11 is a detail view of an optional form of score sheet or record slip produced in the recording apparatus.

Fig. 12 is a detail sectional view of the frictional clutch and related driving mechanism forming part of both the target feeding and score sheet feeding mechanism.

Fig. 13 is a detail view partly in section on line 13—13 of Fig. 12.

Figs. 14 and 15 are detail views of the alternating friction discs of the clutch assembly shown in Fig. 12.

Fig. 16 is a detail view of the circuit closer for the motor energizing circuit as appears in the plane 16—16 of Fig. 17.

Fig. 17 is a detail view of the contact terminals closed by the device shown in Fig. 16 as viewed from the plane 17—17 of Fig. 3.

Fig. 18 is a perspective view of the manual tripping and power actuating mechanism for the score sheet feeding unit.

Fig. 19 is a detail view of a foot operated trip mechanism.

Fig. 20 is a detail view illustrating an electrical push button tripping means.

Like parts are indicated by similar characters of reference throughout the several views.

In using the present system of firearm testing and recording, the gunner tests the gun by firing one or more shots at a distant target and a reproduction of the target pattern is recorded on an inspection ticket either by the gunner himself or by an observer who watches the result of the gun fire upon the target through a telescope. The score sheet or inspection ticket record is manifolded upon differently colored duplicate slips. The score sheet or inspection ticket being filled in, if the gun is rejected a duplicate copy on colored stock is attached and the gun returned for correction. If the gun is approved, a white copy of the test record is attached and the gun sent to the packer or shipping department. The targets and the inspection tickets or score sheets are synchronously advanced and arrested in proper positions by automatic mechanism set in operation by either a manual trip lever or by a foot pedal or button. The feeding mechanism advances and arrests succeeding targets in exactly the same position, and the gunner need not compensate for target placement, which promotes accuracy of the tests and relieves tension and fatigue of the gunner. The use of mechanical target shifting mechanism removes necessity for target tenders, eliminates personal hazard, and speeds inspection. Mechanical feeding means for interchanging score sheets or inspection tickets relieves the gunner or observer, as the case may be, of replacement of record sheets and interleaving of carbon therebetween, while the use of differently colored copies of the record for approved and rejected firearms minimizes error in handling.

Figs. 1 and 2 illustrate an actual installation of the present firearm test system in a factory manufacturing machine guns for current war purposes. On an elevated floor of a building structure 1 at the left of said views are located a plurality of test stalls 2—2, in each of which is stationed a tester A and an observer or checker B. The building 1 is connected by a tunnel 3 with a distantly located tower 4, in which is located remote control target strip feeding and locating mechanism. There is a target viewing window and a target interchange mechanism opposite each test stall 2. The interchange mechanism is arranged to withdraw the target strip 5 from a supply packet 6 at a lower level past the end of the tunnel 3 and observation window 7, where the target is arrested in the field of vision of both the tester or gunner A and the scorer B. The scorer B observes the target through a telescope 8 and records on a conveniently positioned record slip or score sheet the result of the shots fired by the gunner A. By a manual trip device manipulated by the observer, or by a foot trip operated by the gunner, the inscribed score sheet or inspection ticket is ejected or advanced to present a fresh sheet in recording position and simultaneously the target strip in the distant tower 4 is advanced upwardly the distance of one target length to present a fresh target in the field of view opposite the tunnel 3. The used targets are collected and refolded into a packet 9 in an elevated storage compartment 10 of the tower 4. One of the duplicate inspection tickets or score sheets corresponding to the used target which has been ejected from the recording apparatus simultaneously with the advancement of the used target beyond the viewing position is then attached to the tested firearm to show the condition and degree of accuracy thereof, and whether it is suitable for use or must be changed or corrected. The firearm 11 is preferably, but not necessarily, firmly supported while being tested in a jig or fixture in accurately aligned relation with the bull's-eye of the target.

The target strip 5 may be of any desired size and design. While frictional or other forms of strip feeding mechanism may be employed, it is highly desirable that the advancement and subsequent arrest of the targets in test position should be positively and accurately controlled so that each target 12 will be automatically positioned with its center in accurate registry with the center of the field of vision. To this end, the continuous strip 5 of imprinted target faces 12 is provided with longitudinally spaced holes or other configurations for engagement of a suitable strip feeding means. The target strip 5 illustrated is provided with marginally punched feed holes 13 for engagement of a traveling pin type feeding device.

The target feeding and aligning unit illustrated in Figs. 3 and 4 is located at 14 in the upper compartment 10 of the tower 4, and includes a pair of relatively spaced pin wheels 14' progressively engageable in the marginal holes 13 to draw the target strip 5 vertically past the end of the tunnel 3 and window 7, and discharge the retrieved portion of the strip down the inclined table 16 to the collecting packet 9. The weight of the strip of targets, which are twentyfour inches square, is ordinarily sufficient to keep the strip taut as it is being raised past viewing position. In practice approximately forty feet of the strip is suspended and elevated by operation of the pin wheels. However, if found necessary, ample tension may be imposed on the strip by drawing it between staggered rods 15. The pin wheels are driven by an electric motor 17 through successive single cycle operations sufficient to advance the target strip one target length at each operation, at the end of which operative period the motor is automatically arrested. Intermediate the driving motor and the pin type feeding device is a speed reduction gear train which includes a gear pinion 18 on the motor shaft meshing with a larger gear 19 upon the shaft of a worm gear 20 mounted in a supporting standard 21.

The worm 20 meshes with a worm wheel 22 having an integral bearing sleeve 22a loosely mounted upon a rotary shaft 23 within the mounting frame. The shaft 23 is formed with an integral coupling head 24, a stepped cam disc 25—25a and a slotted or splined hub 26. Connected to the worm wheel 22 is a disc 27 and a second disc 28 having formed therefrom driving fingers 29 projecting perpendicular to the planes of the discs and worm wheel. For convenience of manufacture, the discs 27 and 28 are formed independently of the worm wheel and secured thereto for unison rotation by screws, studs or spot welding. If desired, the discs may comprise an integral part of the worm wheel. A friction clutch comprising alternating large and small discs 30 and 31 serves to connect the worm wheel to the shaft 23 for unison rotation. The larger discs 30 are provided with holes 32 through which the driving fingers 29 of the disc 28 project. The alternating smaller discs 31 intermediate the discs 30 are keyed to the hub 26 of the shaft for unison rotation. The friction disc assembly is under compressive pressure of a helical spring 33 surrounding the projecting end of the shaft 23, the tension of which is variable by adjusting a nut 34 thereon.

The larger step 25 of the cam disc which is integral with the coupling head 24 has therein an undulating cam notch in which engages a roller 35 carried by an upwardly extending arm 36 of a reciprocatory plate 37 connected at 38 to a trip lever 39 pivoted at 40. During rotation of the cam disc in unison with the shaft 23 and worm gear 22 the roller 35 rides upon the periphery of the disc 25 and at the end of each rotation comes to rest in the cam notch. The smaller step 25a of the cam disc is formed with a stop shoulder 41 which, at the limit of each revolution of the associated parts, is engaged by the shouldered head of a detent arm 42 pivoted at 43 and urged into the path of the stop shoulder 41 by a retractile spring 43. The shaft 23 is connected by the coupling head 24 with a continuing shaft 44 which carries a gear 45 meshing with a gear pinion 46 upon the pin wheel shaft 14a upon which the pin wheels 14' are mounted.

The actuating motor 17 is energized by operation of the trip lever 39 to actuate the parts through a single cycle sufficient to advance the target strip the distance of one target length, at the limit of which it is arrested. The trip lever 39 is actuated by remote control by energization of a solenoid 47 connected thereto by a link 48. Upon retraction of the trip lever (toward the left of Fig. 5), the plate 37 is shifted to move the roller 35 out of the cam notch of the disc 25. At the same time a spring influenced pawl 49 carried by the reciprocatory plate 37 engages the detent arm 42 to disengage the shouldered head thereof from the stop shoulder of the cam 25a and so release the shaft 23 for rotation. The reciprocatory plate 37 is formed with a lateral terminal flange 50, to which is connected a plunger stud 51, which is movable therewith against the tension of a helical retracting spring 52. In its operated position the plunger 51 engages and closes the motor energizing circuit through a pair of spaced contacts 53 to start the motor 17. The reciprocatory plate 37 is held in its operated position by the engagement of the roller 35 with the periphery of the cam 25 until one complete rotation of the latter has been effected. During this period the motor circuit is maintained closed by engagement of the plunger 51 with the spring contacts 53. At the completion of a single rotation of the cam 25 and shaft 23, which is sufficient to drive the pin wheel shaft and pin wheels 14' the distance of one complete target length, the re-entry of the roller 35 into the cam notch of the disc 25 permits retraction of the reciprocatory plate 37 under influence of the spring 52 and withdrawal of the plunger 51 to again open the motor circuit. The retraction of the plate 37 also restores the trip lever 39 to normal. The detent arm 42 which has been automatically disengaged by the pawl 49 at the limit of initial movement of the reciprocatory plate, and subsequently rides upon the periphery of the disc 25a, automatically reengages the stop shoulder 41 at the completion of the revolution of the cam, to positively arrest the pin wheels 14' when the succeeding target has been properly positioned. The presently described drive mechanism has been found particularly effective, but it is to be understood that other forms of remote control single cycle motion transmitting mechanism may be employed to advance the target strip predetermined lengths at each operation and positively arrest it with a succeeding target in the prescribed position.

To enable remote control of the target advancement and synchronize the feeding of the target strip with that of the score sheets or inspection tickets, there is provided conveniently to the position of the observer or scorer B, within the building 1, a strip feeding and manifolding apparatus 54 wherein continuous superposed strips of series connected detachable score sheets or record slips are progressively advanced from a supply packet 55 and over a writing tablet 56, by pin wheels 57, engageable in marginally punched holes in the record strips. Carbon or transfer material is interposed between the strips at the writing position, by which one or more duplicate records are simultaneously produced. Several duplicate record slips or score sheets are ejected from the apparatus at each operation and detached from the supply strip for attachment to the gun tested, while one or more copies thereof are automatically deposited in a receiving compartment 58 of the recording apparatus 54 for future reference.

The actuating mechanism for driving the pin wheels 57 to advance the score sheet strip or strip of inspection tickets measured distances and arrest it at the end of each advancement thereof, is identical with that heretofore described in relation with the advancement of the target strip, except the advancement is through a much less range of travel and hence the motion amplifying gear train is abbreviated. In this instance, the driving motor is directly connected with the worm gear 20, thereby eliminating the gears 18 and 19. Likewise, the gears 45 and 46 are eliminated and the worm driven shaft 23 is connected directly with the pin wheel shaft 59 of the recording apparatus 54, thus directly driving the pin wheels 57. The unit is provided with a manually operable tripping lever 39' which corresponds to the solenoid operated tripping lever 39 of the target strip feeding mechanism.

Each recording apparatus or score sheet feeding mechanism is connected in an energizing circuit which is closed by the plunger 51 upon actuation of the trip lever 39'. Carried by the pin wheel shaft 59 of the recording apparatus is a cam 60 which cooperates with a circuit make and break device controlling the distantly located solenoid 47 pertaining to the corresponding target feeding mechanism. The make and break circuit closer comprises two spring contact fingers 62 and 63 which are normally spaced apart to maintain the solenoid circuit open. The rotary cam 60 is so positioned as to engage one of the spring fingers and deflect it into contact with the other finger upon operation of the recording apparatus and actuation of the pin wheel shaft 59. Closing the contacts 62—63 energizes the distantly located solenoid 47 to actuate the trip lever 39 of the target feeding apparatus and set the latter in operation to advance the target strip one target length simultaneouslyl with the advancement of the score sheet strip or strip of inspection tickets one form length.

However, there occur circumstances wherein it is desirable to advance the score forms without advancing a target, or vice versa. To do this, provision is made to either close the contacts 62—63 manually without operating the score strip feeding apparatus to advance a new target into position, or by preventing the closing of the contacts 62—63 by the cam 60 in the event it is desired to advance a fresh score sheet or record slip into recording position without advancing a corresponding target. To accomplish such optional feeding of targets or score sheets either independently of the other, a finger lever 64 positioned adjacent to one of the spring contact fingers of the circuit closer is provided with a cam 65 which normally holds the contact finger in moderately spaced relation, in which they may be completely closed by the cam 60. By manually swinging the finger lever in one direction, a flat or low side of the cam is brought adjacent to one spring finger to permit the latter to spring into contact engagement with the other contact finger. This closes the circuit through the distant solenoid and energizes the target feeding apparatus independently of the cam 60 and the recording apparatus. Upon swinging motion of the finger lever in the opposite direction, a high area of the cam 65 is brought into engagement with the spring contact finger to force the finger farther away from the opposing finger a sufficient distance that the cam 60 cannot close the gap therebetween, in which event the solenoid will not be energized and only the score sheet feeding apparatus 54 will be operated.

A schematic wiring diagram of these electrical circuits and their controls is shown in Fig. 7, in which the rectangular forms shown at the bottom thereof represent merely connection or outlet boxes in which the common connections of the various circuits are made.

The score sheet may be of any desired form, as may also the target. The score sheet or record slip may have imprinted thereon a reproduction of the target in miniature form upon which the scorer or observer may "spot" the location of the hits upon the distant target as observed through the telescope. Otherwise, the observer may enter in appropriately printed spaces of a score sheet the zone and radial positions of the hits as compared with a clock face, as is quite common practice in identifying target scores, and also preferably enters thereon the serial number of the gun and that of the target for identification purposes, and any comments upon the action of the gun and suggestions for correction of errors, which report is attached to the gun in lieu of the original target, which is too large and inconvenient for this purpose.

The duplicate copy of the inspection tickets or score sheets deposited in the cabinet of the recording apparatus 54 provides a permanent record of the firearm tests in continuous sequence.

In lieu of manually tripping the lever 39' of the recording apparatus to initiate operation of the inspection ticket and target feeding mechanisms, the trip lever may be connected with a foot pedal 66, as shown in Fig. 19, connected by a link 67 with the trip arm, or may be arranged for electrical operation by foot depression of a starting button 68 on the floor by which an electromagnet or solenoid 69 is energized to actuate the tripping lever 39'.

The building 4, or at least that portion adjacent to the target position which is subject to gun fire, is preferably of concrete or is armored to resist the impact of misdirected bullets. Immediately back of the target position is a funnel shaped collector 70 for bullets passing through the target. The collector 70 is connected by a conduit tube 71 with a receptacle 72 placed at a lower level in which the spent bullets are collected by gravity.

While for illustrative purposes the target feeding devices have been shown engageable in marginally punched holes in the target, it is to be understood that the feed holes may be otherwise positioned, and indeed that other feeding means may be employed for advancing the targets one by one and automatically positioning them in centered relation with the observation area 7, and for remotely controlling the feeding of the targets in synchronism with advancement of corresponding score sheets or inspection tickets at a distant position.

While the target herein shown is of conventional bull's-eye type and the target strip is intermittently advanced, for shooting gallery or amusement purposes the target imprints may be of any style, such as pictorial illustrations of animals, birds, or persons. By maintaining the contacts 62—63 closed for an extended period of time, the advancement of a series of such pictorial targets past the target viewing position may be made continuous.

In lieu of manually spotting the inspection ticket or score sheet in agreement with the hits upon the distant target, a camera may be substituted for the telescope 8, by which the target is photographed to photographically produce a record. In such alternative means the strip feeding apparatus 54 would serve to periodically advance the photographic film past the recording position opposite the camera lens, instead of advancing the paper strip over the writing tablet. The system of remote control and tripping of the operative mechanism would be substantially identical with that heretofore described, and for that reason duplicate illustration is believed unnecessary.

For use under conditions wherein the size of the duplicate record sheet is not material, nor large size objectionable, the same strip feeding and control mechanism may be utilized to advance duplicate superposed strips of targets into viewing position. The hits recorded upon one target would also appear upon the underlying target. One of the target strips may be divided into individual target sheets for use as record or score sheets to accompany the gun being tested or for other distribution while another continuous strip of targets may be preserved by being refolded into the packet 9. In such event, the record strip feeding and manifolding apparatus 54 would be unnecessary and may be omitted.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A firearm testing apparatus, including a strip feeding mechanism for feeding a continuous strip of score sheets predetermined distances and arresting the strip in a record receiving position, a distantly located target strip feeding mechanism for advancing a continuous strip of target portions predetermined distances and arresting the target strip in a viewing position, remote control means for energizing the target strip feeding mechanism to advance the target strip, operator controlled means for energizing the score sheet feeding mechanism, an interconnecting device for automatically operating the remote control means pertaining to the target feeding mechanism by operation of the score sheet feeding mechanism, and optional operation determining means enabling operation of one strip feeding mechanism independently of the other.

2. A firearm testing apparatus, including a strip feeding mechanism for feeding a continuous strip of score sheets predetermined distances and arresting the strip in a record receiving position, a distantly located target strip feeding mechanism for advancing a continuous strip of target portions predetermined distances and arresting the target strip in a viewing position, remote control means for energizing the target strip feeding mechanism to advance the target strip, operator controlled means for energizing the score sheet feeding mechanism, an interconnecting device for automatically operating the remote control means pertaining to the target feeding mechanism by operation of the score sheet feeding mechanism, and a selective device for enabling optional operation of either of the strip feeding mechanisms independently of the other.

3. A firearm testing apparatus, including a strip feeding mechanism for feeding a continuous strip of score sheets predetermined distances and arresting the strip in a record receiving position, a distantly located target strip feeding mechanism for advancing a continuous strip of target portions predetermined distances and arresting the target strip in a viewing position, remote control means for energizing the target strip feeding mechanism to advance the target strip, operator controlled means for energizing the score sheet feeding mechanism, and optionally selective means enabling operation of the respective strip feeding mechanisms synchronously or independently.

4. Widely separated strip feeding mechanisms for advancing a strip of series connected target sheets and a strip of series connected score record sheets different distances and arresting corresponding target areas and score receiving areas of the respective strips in positions of use, an electrical circuit for synchronously actuating the relatively distantly disposed strip feeding mechanisms, a control member therefor, and cut-out means enabling the actuation of one of the strip feeding mechanisms independently of the other.

5. Widely separated strip feeding mechanisms for advancing a strip of series connected target sheets and a strip of series connected score record sheets different distances and arresting corresponding target areas and score receiving areas of the respective strips in positions of use, an electrical circuit for synchronously actuating the relatively distantly disposed strip feeding mechanisms, a control member therefor, and cut-out means enabling the optional actuation of either of the strip feeding mechanisms independently of the other.

6. A target interchange and fire recording system wherein a distantly located strip of target imprints is intermittently advanced to present successive target faces in a viewing position, in synchronism with intermittent advancement of a record strip at the shooter's position to present successive score areas corresponding to the respective targets in record receiving position, including a pin type feeding device progressively engageable with the target strip for advancing the target strip through successive measured distances, an actuating motor therefor, a motion transmitting mechanism connecting said motor and said feeding device, a reciprocatory slide, an electric switch controlling the motor opened and closed by the to and fro motion of the slide, a rotary cam having a recess therein, a roller on the slide engageable in the recess at the limit of each cycle of operation of the motor, a detent for the motion transmitting mechanism operative to temporarily lock the motion transmitting mechanism at the limit of each cycle of operation, and disengaged by operation of the slide, an actuating lever for moving said slide to disengage the slide roller from the cam recess and disengage the detent, and simultaneously close the motor control switch, the slide being held in its operated position by the engagement of the roller with the cam during the completion of the cycle of operation, including one complete rotation of the cam whereupon the reentry of the slide roller into the cam recess permits return of the slide and simultaneous reengagement of the detent and opening of the control switch, an electromagnet for operating the control lever from the shooter's position, an electric circuit therefor, a strip feeding means for the record strip at the shooter's position, means for actuating the latter strip feeding means and a circuit closer operated thereby in timed sequence to close said electromagnet circuit to energize the electromagnet to initiate the operation of the target strip feeding mechanism.

7. A target change and fire recording system wherein a distantly located strip of target imprints is intermittently advanced to present successive target imprints in viewing position, and a recording strip is simultaneously advanced at the shooter's position to present successive record areas corresponding to the targets in recording position, including electrically actuated strip feeding mechanism for advancing the target strip, strip feeding mechanism for advancing the record strip in synchronism with advancement of the target strip, an electrical circuit controlling the distant target strip feeding mechanism, including a circuit closer controlled by the record strip feeding mechanism to close said circuit and energize the distant target strip feeding mechanism in timed sequence, and means for at will closing the circuit closer to energize the target strip feeding mechanism to advance a target independently of the operation of the record strip feeding mechanism, whereby a target will be advanced into viewing position without advancement of a corresponding portion of the record strip, and for further rendering the record strip feeding means incapable of automatically closing said circuit closer, whereby the record strip may be advanced at will independently of the advancement of the target strip.

8. A target changing and fire recording system wherein a continuous strip of target impressions is intermittently advanced to present succeeding target faces in viewing position and a record strip is advanced in synchronism therewith to present succeeding record areas corresponding to the targets in recording position, including an autographic register in which a record strip is advanced from a source of supply over a writing tablet upon which the record strip receives hand written inscriptions, strip feeding means in said register, an electrical circuit, a circuit closer in said circuit intermittently closed by actuation of the autographic register, a distantly located strip feeding mechanism for the target strip and electrical control mechanism therefor energized upon the closing of said circuit closer by actuation of the autographic register.

9. A target changing and fire recording system wherein a continuous strip of target impressions is intermittently advanced to present succeeding target faces in viewing position and a record strip is advanced in synchronism therewith to present succeeding record areas corresponding to the targets in recording position, including an autographic register in which a record strip is advanced from a source of supply over a writing tablet upon which the record strip receives hand written inscriptions, strip feeding means in said register, an electrical circuit, a circuit closer in said circuit intermittently closed by actuation of the autographic register, a distantly located strip feeding mechanism for the target strip, electrical control mechanism therefor energized upon the closing of said circuit closer by actuation of the autographic register, and manual means for closing the circuit closer independently of operation of the autographic register, to effect advancement of the target strip, and for further maintaining the circuit closer open independently of the operation of the autographic register, whereby the target strip and the record strip may be advanced independently and out of synchronism with one another.

10. A target change and fire recording system wherein a distantly located strip of target imprints is intermittently advanced to present succeeding targets in a viewing position, intermittently operative electrically energized strip feeding means therefor, an autographic register at the shooter's station, electrically energized strip feeding means therein by which a record strip is intermittently advanced past a recording position at which it may receive hand inscribed records, and an electrical control circuit between the autographic register strip feeding means and the target strip feeding means for effecting their operation to advance the respective strips in synchronism.

11. A target change and fire recording system wherein a distantly located strip of target imprints is intermittently advanced to present succeeding targets in a viewing position, intermittently operative electrically energized strip feeding means therefor, an autographic register at the shooter's station, electrically energized strip feeding means therein by which a record strip is intermittently advanced past a recording position at which it may receive hand inscribed records, an electrical control circuit between the autographic register strip feeding means and the target strip feeding means for effecting their operation to advance the respective strips in synchronism, and manual control means for effecting at will the energization of either the target strip feeding means or the record strip feeding means independently of the other.

12. A target changer and fire recording apparatus, including a distantly located electrically energized strip feeding device for advancing a continuous strip of target sections to present succeeding target faces in viewing position, an autographic register at the shooter's station, an electrically energized strip feeding device therein for progressively advancing a continuous record strip, a writing tablet over which the strip is advanced and upon which succeeding record areas may receive hand written record inscription, and an electrical control circuit between the autographic register and the target strip feeding device causing advancement of the target strip and the record strip in synchronism and manual means for effecting the independent energization of one of said strip feeding devices independently of the other.

13. A target changer and fire recording apparatus wherein a target bearing strip and a record strip are advanced in synchronism to present successive target faces in viewing position and succeeding record receiving areas in recording position, including pin type feeding devices for each of the strips, actuating means for one of the strip feeding devices, including an electric motor, an energizing circuit therefor, a motor driven shaft, operatively connected with the pin type feeding device for such strip, a locking detent arresting the shaft at the end of a predetermined cycle of operation, a circuit closer for said circuit, a reciprocatory slide which by its movement in one direction disengages the locking detent and closes the circuit closer to start said motor, a stop member preventing the return of said slide prior to the completion of the cycle of operation, a lever for actuating the slide to initiate the cycle of operation of said motor and strip feeding device, and actuating means for the other strip feeding device operated in synchronism with that before described and an electrical control circuit interconnecting the actuating means of the respective strip feeding devices.

14. A target changer and fire recording apparatus, wherein a strip of series connected targets and a record strip of score areas are advanced in synchronism, including a pin type strip feeding mechanism for the target strip, actuating mechanism therefor operable through a predetermined cycle of operation and arrested at the end thereof to present succeeding target faces in viewing position, an autographic register, including a strip feeding device and a writing tablet over which the record strip is advanced from a source of supply into recording position on the writing tablet to receive hand inscribed records of the fire results upon the corresponding target, motor operated actuating mechanism for the autographic strip feeding device, a control circuit for the target strip feeding actuating mechanism, and a circuit closer therein closed by the operation of the autographic register for synchronizing the operation of the target strip feeding mechanism therewith.

15. A target interchange and fire record apparatus including a distantly located target strip feeding mechanism for advancing a continuous strip of targets step by step to present succeeding targets in viewing position, an autographic register wherein a continuous strip of record material is advanced through step by step movement to present succeeding record receiving areas thereon in position to receive hand inscribed data, strip feeding means in said register, electrical actuating means therefor, electrical remote control means for actuating the target strip feeding mechanism, and means for energizing the target strip feeding mechanism in synchronism with the operation of the autographic register, by the operation of the latter.

16. A target change and fire recording apparatus, including a target strip feeding mechanism for progressively advancing a continuous strip of series connected targets to present succeeding target faces in viewing position, electrically operated actuating means therefor, a remotely located autographic register upon which to record the results of firearm test made upon the positioned targets including strip feeding mechanism for advancing a record strip to present succeeding record receiving areas thereof in record receiving position to receive hand inscribed records, a circuit closer associated with the autographic register strip feeding mechanism and closed by actuation thereof, an electrical control circuit closed by the circuit closer to initiate the operation of the remote target strip feeding mechanism.

17. A target change and fire recording apparatus, including a target strip feeding mechanism for progressively advancing a continuous strip of series connected targets to present succeeding target faces in viewing position, electrically operated actuating means therefor, a remotely located autographic register upon which to record the results of firearm tests made upon the positioned targets including strip feeding mechanism for advancing a record strip to present succeeding record receiving areas thereof in record receiving position to receive hand inscribed records, a circuit closer associated with the autographic register strip feeding mechanism and closed by actuation thereof, an electrical control circuit closed by the circuit closer to initiate the operation of the remote target strip feeding mechanism, and a manually operated device for at will closing the said electrical circuit independly of the operation of the autographic register.

18. A target change and fire recording apparatus, including a target strip feeding mechanism for progressively advancing a continuous strip of series connected targets to present succeeding target faces in viewing position, actuating means therefor, a remotely located autographic register upon which to record the results of firearm tests made upon the positioned targets including strip feeding mechanism for advancing a record strip to present succeeding record receiving areas thereof in record receiving position to receive hand inscribed records, a circuit closer associated with the autographic register strip feeding mechanism and closed by actuation thereof, an electrical control circuit closed by the circuit closer to initiate the operation of the remote target strip feeding mechanism, and a manually operated device for at will preventing closing of the said electrical circuit by operation of the autographic register.

ALBERT W. METZNER.